(12) United States Patent
Sisk

(10) Patent No.: US 7,367,543 B2
(45) Date of Patent: *May 6, 2008

(54) SOLENOID VALVE FOR FLUID FLOW

(75) Inventor: Gregory E. Sisk, Farmington, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/653,777

(22) Filed: Jan. 16, 2007

(65) Prior Publication Data

US 2007/0145318 A1    Jun. 28, 2007

Related U.S. Application Data

(63) Continuation of application No. 10/903,919, filed on Jul. 30, 2004, now Pat. No. 7,163,188.

(51) Int. Cl.
*F16K 31/02* (2006.01)

(52) U.S. Cl. .................. 251/129.19; 251/284

(58) Field of Classification Search ........... 251/129.19, 251/30.02–30.04, 284; 137/630.22
See application file for complete search history.

(56) References Cited

U.S. PATENT DOCUMENTS 3,494,376 A * 2/1970 Doeringsfeld et al. . 137/630.19
7,011,110 B1 * 3/2006 Stark .................... 137/630.22

* cited by examiner

*Primary Examiner*—John Bastianelli
(74) *Attorney, Agent, or Firm*—Harness, Dickey & Pierce, P.L.C.

(57) ABSTRACT

A solenoid valve is provided that comprises a valve body having an inlet and an outlet, and a movable member for moving a valve element away from a valve seat to open the valve. The moveable member engages and moves the valve element away from the seat to an open position when the solenoid is actuated. When the solenoid is not actuated, a biasing spring moves the moveable member to disengage from the valve element, which returns to a closed position. The moveable member does not transfer any impact force to the valve element on closure of the valve member, so that the valve may be operated a significant number of cycles without failure.

18 Claims, 2 Drawing Sheets

SOLENOID VALVE FOR FLUID FLOW

FIELD OF THE INVENTION

This invention relates to solenoid valves, and more particularly to solenoid valves having a concentric inlet and outlet passages.

BACKGROUND OF THE INVENTION

Solenoid actuators are commonly used to control the flow of fluids through a valve, and may be electrically actuated. Various references have disclosed solenoid valve designs in which a moveable member is in engagement with a valve, and operates the valve between an open and a closed position. However, such valve designs are not capable of withstanding numerous cycles of the valve opening and closing due to the impact force imparted by the moveable member on the valve and valve seat. Also, the typical valve design is such that a connection of both the inlet and outlet are required, which adds to the cost and assembly time of the valve.

SUMMARY OF THE INVENTION

The present invention relates to a solenoid actuated valve for controlling the flow of fluid through the valve. A preferred embodiment of a valve constructed according to the principles of this invention comprises an inlet; an outlet; a valve seat in the flow path between the inlet and outlet. The valve further comprises a valve member; a stop for engaging the valve member; and a first spring for biasing the valve member against the stop. A solenoid can selectively move the valve member against the bias of the spring away from the stop. A valve element is mounted on the valve member with a second spring that resiliently biases the valve element into sealing engagement with the valve seat when the valve member is in its stopped position.

In this preferred embodiment, the first spring biases the valve member against the stop, and the second spring biases the valve element against the valve seat. The solenoid moves the valve member away from the stop, which moves the valve element away from the seat. When the solenoid is de-energized, the valve member moves back to the stop under the bias of the first spring, and the valve element moves back toward the valve seat. The valve element contacts the valve seat first and continued movement of the valve member is accommodated by the second spring, until the stop engages the valve member, preventing the full impact of the valve member from being transferred to the valve element. Thus, in the preferred embodiment, the impacts between the valve element and the valve seat are reduced, which can extend the operational life of the valve.

In the preferred embodiment, the valve inlet and valve outlet are located on the same face of the valve, and preferably co-axially arranged so that the valve can be threaded into an opening. Thus, the valve is particularly well-suited for use in controlling a compressor, such as a scroll compressor, although the invention is not so limited.

These and other features and advantages of the invention will be more fully understood from the following detailed description of the invention taken together with the accompanying drawings.

DETAILED DESCRIPTION OF THE INVENTION

Figure 1:
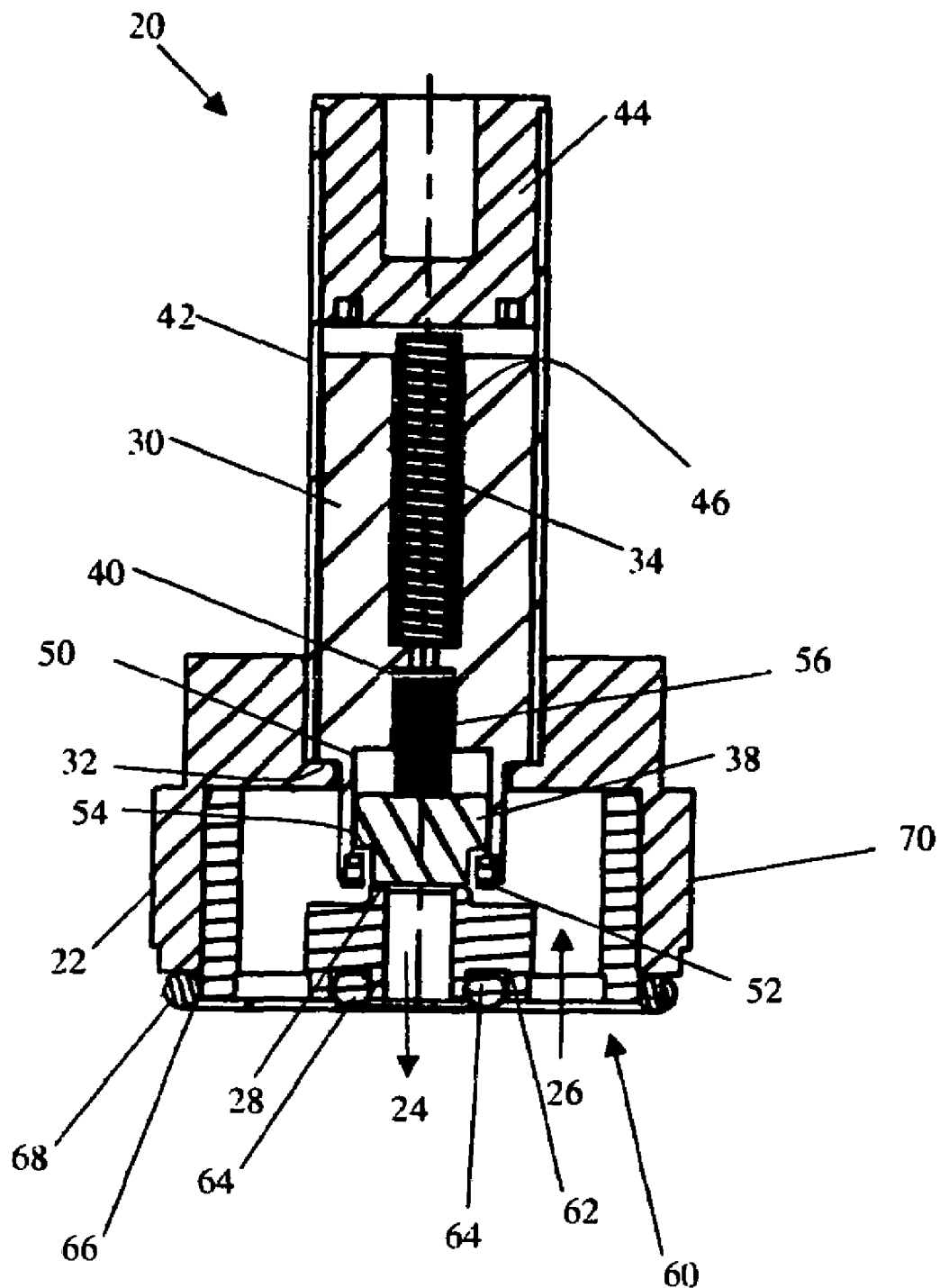
FIG. 1 is a longitudinal cross-sectional view of a preferred embodiment of a solenoid valve in accordance with the principles of the present invention.

A solenoid valve in accordance with the principles of the present invention is indicated generally as 20 in FIG. 1. The solenoid valve 20 comprises a valve casing or housing 22 having at least one inlet 26 and at least one outlet. In the preferred embodiment there is a single outlet 24, and a plurality of inlets 26 concentrically positioned around the outlet 24. A valve seat 28 is positioned in the flow path between the inlet, 26 and the outlet 24.

A valve member 30 is mounted to move toward and away from the valve seat 28. The valve includes a stop 32 for engaging the valve member 30, and a spring 34 for biasing the valve member 30 toward the stop 32 and valve seat 28. In this preferred embodiment, the spring 34 is a coil spring, but the spring 34 could be any other element for applying a resilient force to the valve member 30, biasing it toward the stop 32.

A solenoid 36 (FIG. 2), surrounds the valve member 30, and when energized moves the valve member 30 against the bias of the spring 34 away from the stop 32 towards 44. A valve element 38 is mounted on the valve member 30 with a spring 40 that resiliently biasing the valve element into sealing engagement with the valve seat when the valve member is in its stopped position. In this preferred embodiment, the spring 40 is a coil spring, but the spring 40 could be any other element for applying a resilient force to the valve element 38, biasing it toward the seat 28.

The spring 34 biases the valve member 30 against the stop 32, and the spring 40 biases the valve element 38 against the seat 28. When the solenoid 36 is energized, it moves the valve member 30 against the bias of the spring 34 away from the stop 32, which in turn moves the valve element 38 away from the seat 28, so that the valve is open, and fluid can flow into the inlet 26 through the valve and out the outlet 24. When the solenoid 36 is de-energized, the spring 34 biases the valve member 30 and the valve element 38 toward the valve seat 28 and stop 32. The valve element 38 contacts the valve seat 28, and stops moving, Further movement of the valve member 30 is accommodated by the spring 40, until the valve member 30 contacts the stop 32, which arrests further movement of the valve member 30, and absorbs the impact of its movement, preventing it from being transferred to valve member 38 and valve seat 28. Thus the impact force of the valve element 38 against the valve seat is reduced, reducing damage to the valve element 38 and valve seat 28, extending the useful life of the valve 20.

Figure 2:
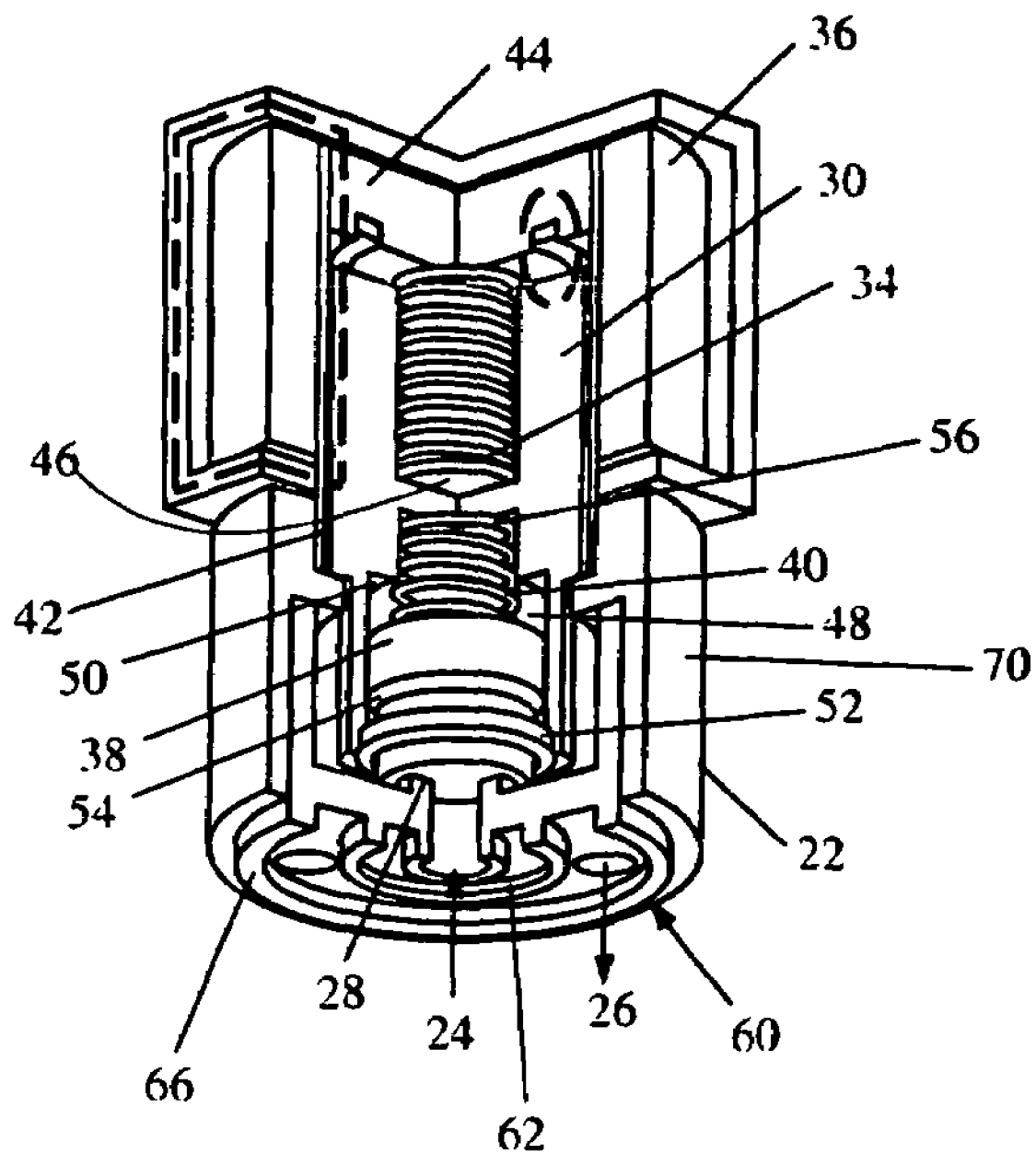
FIG. 2 is a perspective view of the solenoid valve, with portions removed to show details of the construction.

As shown in FIGS. 1 and 2, the solenoid valve 20 preferably includes a tube 42 having one end secured to the valve housing 22, and a stationary core 44 secured within the opposite end. The stop 32 is formed at the junction between the first end of the tube 40 and the valve body 22. The valve member 30 is slideably disposed in the tube 42, and the coil of the solenoid 36 surrounds the tube 42. The valve member 30 has a central passage 46 for receiving the spring 34, one end of which contacts the valve member, and the other end of which contacts the stationary core 44 in the tube 42. A circumferential shoulder 48 extends around the valve member 30 to engage the stop 32.

A chamber 50 open in one end of the valve member 30 for receiving the valve element 38. The mouth of the chamber 50 has a ring 52 that engages a shoulder 54 formed on the valve element 38, retaining the valve element in the chamber. A passage 56 extends inwardly from the chamber 50, for receiving the spring 40, one end of which engages the valve member 30 and the other end of which engages the valve element 38, to bias the valve element 38 toward the valve seat 28 while the ring 52 engages the shoulder 54 on the valve element 38 to retain the valve element in the chamber 50 in the valve member 30.

In the preferred embodiment, the valve element 38 may be made of a lightweight fluorinated hydrocarbon polymer such as Teflon, or other polymeric or resilient sealing material, or a combination of different materials bonded together. The valve element 30 sealingly engages the valve seat 28 in a closed position when the solenoid 36 is not actuated. When the solenoid 36 is actuated, the valve member 30 moves away from the stop 32 and the valve seat 28. As the valve member 30 moves, the ring 50 engages the valve element 38, pulling it away from the valve seat 28. The initial movement of the valve member 30 before the valve element 38 moves provides an impact to the valve element that helps unseat the valve element. As described above, when the solenoid 36 is de-actuated the spring 34 moves the valve member 30 toward the valve seat 28. The valve element 38 contacts the valve seat 28, and further movement of the valve member 30 under the bias of spring 34 is accommodated by the spring 40. The shoulder 48 on the valve member 30 eventually engages the stop 32, stopping further movement of the valve member and absorbing impact. Thus, while the valve member has an effective mass to be operated by the solenoid 36 and to close the valve quickly when the solenoid is de-actuated, the valve element is shielded from the brunt of the impact of the valve member moving toward its closed position, thereby preserving the life of the valve element 38 and the valve seat 28. Testing of one preferred embodiment of a solenoid valve incorporating the principles of the present invention has yielded 32 million cycles of flow control operation at 140 psig. Thus, the present invention to provide an economical robust valve design that can operate for a significant number of cycles without failure by significantly reducing the impact force of the valve against the valve seat when the valve is closed.

As shown in the Figures, the valve 20 preferably has a front face 60 in which both the inlets 26 and the outlet 24 open. The front face 60 preferably has an inner circular channel 62 for mounting an o-ring 64 which can sealingly separate the inlets 26 and the outlet 24. The front face 60 preferably also includes a circular ridge 66 which for mounting an o-ring 68, which can sealingly separate the outlets 26 between the o-rings 64 and 68. The body 22 is preferably has a threaded surface 70 so that the valve 20 can be threaded into an opening, for example in a scroll compressor.

Because of the extended service life this valve is particularly well suited for use in a compressor, which because of the long service life of the valve can be operated continuously, reducing start-up wear on the compressor and motor.

The advantages of the above described embodiment and improvements should be readily apparent to one skilled in the art, as to enabling a resilient, high cycling solenoid valve for fluid control. Additional design considerations, such as the control of the application of voltage to the solenoid coil, may be incorporated without departing from the spirit and scope of the invention. Accordingly, it is not intended that the invention be limited by the particular embodiment or form described above, but by the appended claims.

What is claimed is:

1. A solenoid operated valve comprising:
    an inlet;
    an outlet;
    a valve seat in the flow path between the inlet and outlet;
    a valve member having an end with a chamber opening therein and an engagement member approximate said chamber opening;
    a stop for engaging the valve member to thereby limit the travel of the valve member;
    a spring for biasing the valve member against the stop;
    a solenoid for moving the valve member against the bias of the spring away from the stop;
    a valve element having a shoulder that is received within the chamber opening and retained by the engagement member on the valve member; and
    a spring resiliently biasing the valve element into sealing engagement with the valve seat when the valve member is in its stopped position, wherein actuation of the solenoid moves the valve member away from the stop and causes the valve member to engage the shoulder of the valve element to move the valve element away from the valve seat.

2. The solenoid operated valve according to claim 1 wherein the valve has a front face, and wherein the inlet and the outlet are located in the front face.

3. The solenoid operated valve according to claim 2 wherein the inlet comprises at least one opening, and wherein the outlet comprises a plurality of openings surrounding the at least one opening comprising the inlet.

4. The solenoid operated valve according to claim 2 wherein the outlet comprises at least one opening, and wherein the inlet comprises a plurality of openings surrounding the at least one opening comprising the outlet.

5. The solenoid operated valve according to claim 1 wherein the valve element comprises a polymeric material.

6. The solenoid operated valve according to claim 1 wherein the valve element comprises a fluorinated hydrocarbon polymer.

7. The solenoid operated valve according to claim 1 wherein the valve member comprises a chamber, and wherein the valve element is mounted within the chamber, and engages the valve seat before the valve member engages the stop.

8. The solenoid operated valve according to claim 1 wherein the valve element has a shoulder thereon, and wherein the valve member has a lip that engages and retains the valve element.

9. A solenoid operated valve comprising:
    an inlet;
    an outlet;
    a valve seat in the flow path between the inlet and the outlet;
    a valve member having a shoulder portion thereon, and an end portion with a chamber opening therein and an engagement member approximate said chamber opening;
    a stop;
    a spring for resiliently biasing the valve member to a closed position in which the shoulder portion of the valve member is adjacent the stop;
    a solenoid for moving the valve member from its closed position adjacent the stop to an open position away from the stop;

a valve element having a shoulder that is reciprocally mounted in the chamber opening in the valve member and retained by the engagement member on the valve member, and a spring resiliently biasing the valve element to project from the valve member to sealingly engage the valve seat when the valve member is in its closed position, wherein actuation of the solenoid moves the valve member away from the stop and causes the valve member to engage the shoulder of the valve element to move the valve element away from the valve seat.

10. The solenoid operated valve according to claim 9 wherein the valve has a front face, and wherein the inlet and the outlet are located in the front face.

11. The solenoid operated valve according to claim 10 wherein the inlet comprises at least one opening, and wherein the outlet comprises a plurality of openings surrounding the at least one opening comprising the inlet.

12. The solenoid operated valve according to claim 10 wherein the outlet comprises at least one opening, and wherein the inlet comprises a plurality of openings surrounding the at least one opening comprising the outlet.

13. The solenoid operated valve according to claim 9 wherein the valve element comprises a polymeric material.

14. The solenoid operated valve according to claim 9 wherein the valve element comprises a fluorinated hydrocarbon polymer.

15. The solenoid operated valve according to claim 9 wherein the valve member comprises a chamber, and wherein the valve element is mounted within the chamber, and engages the valve seat before the valve member engages the stop.

16. The solenoid operated valve according to claim 9 wherein the valve element has a shoulder thereon, and wherein the valve member has lip that engages and retains the valve body.

17. A solenoid operated valve comprising:
an inlet;
an outlet;
a valve seat in the flow path between the inlet and the outlet;
a valve member slidably mounted for movement in a direction aligned with, but perpendicular to the plane of the valve seat, the valve member having a chamber opening in one end, an engagement member approximate said chamber opening and a shoulder thereon;
a stop for engaging the shoulder on the valve member to restrict movement of the valve member toward the valve seat;
a spring for resiliently biasing the valve member to a closed position in which the shoulder abuts the stop;
a solenoid for moving the valve member from its closed position adjacent the stop to an open position away from the stop;
a valve element having a shoulder portion that is reciprocally mounted in the chamber opening in the valve member and retained by the engagement member on the valve member, and
a spring resiliently biasing the valve element toward the distal end of the valve member to sealingly engage the valve seat when the valve member is in its closed position, wherein actuation of the solenoid moves the valve member away from the stop and causes the valve member to engage the shoulder portion of the valve element to move the valve element away from the valve seat.

18. The solenoid operated valve according to claim 17 wherein the valve member has a shoulder for engaging a lip on the valve member and limiting movement of the valve element.

* * * * *